United States Patent
Li et al.

(10) Patent No.: US 7,132,064 B2
(45) Date of Patent: Nov. 7, 2006

(54) METHOD FOR MANUFACTURING BRIGHTNESS ENHANCEMENT FILM OF LIQUID CRYSTAL DISPLAY AND STRUCTURE THEREOF

(75) Inventors: Tung Lung Li, Tucheng (TW); Pei Lun Wu, Pingjhen (TW); Long Hai Wu, Bade (TW)

(73) Assignee: Optimax Technology Corporation (TW)

( * ) Notice: Subject to any disclaimer, the term of this patent is extended or adjusted under 35 U.S.C. 154(b) by 194 days.

(21) Appl. No.: 10/761,085

(22) Filed: Jan. 20, 2004

(65) Prior Publication Data

US 2004/0150773 A1  Aug. 5, 2004

(30) Foreign Application Priority Data

Jan. 22, 2003  (TW) .............................. 92101406 A

(51) Int. Cl.
*B29D 11/00* (2006.01)

(52) U.S. Cl. ........................ 264/1.36; 264/1.38; 264/1.7

(58) Field of Classification Search ................ 264/1.1, 264/1.36, 1.38, 1.7, 1.34; 428/1.1; 349/115
See application file for complete search history.

(56) References Cited

U.S. PATENT DOCUMENTS

| | | | |
|---|---|---|---|
| 5,506,704 A * | 4/1996 | Broer et al. ................... 349/98 |
| 5,737,044 A * | 4/1998 | Van Haaren et al. ......... 349/61 |
| 6,559,903 B1 * | 5/2003 | Faris et al. .................... 349/16 |
| 6,573,961 B1 * | 6/2003 | Jiang et al. ................... 349/115 |
| 6,627,270 B1 * | 9/2003 | Nishimura ................... 428/1.3 |
| 6,630,974 B1 * | 10/2003 | Galabova et al. ........... 349/119 |
| 6,654,080 B1 * | 11/2003 | Khan et al. ................... 349/73 |
| 6,721,030 B1 * | 4/2004 | Hsieh et al. ................. 349/191 |
| 6,753,044 B1 * | 6/2004 | Faris et al. .................... 428/1.1 |
| 6,831,720 B1 * | 12/2004 | Jiang et al. ................... 349/115 |

FOREIGN PATENT DOCUMENTS

| EP | 0 881 510 A2 | 12/1998 |
|---|---|---|
| JP | 09-304770 | 11/1997 |

* cited by examiner

*Primary Examiner*—Mathieu D. Vargot
(74) *Attorney, Agent, or Firm*—The Webb Law Firm

(57) ABSTRACT

A method for manufacturing a brightness enhancement film of a liquid crystal display and a structure thereof are provided. The method includes: (a) providing a first substrate, (b) forming a first macromolecule liquid crystal on said first substrate, (c) curing a part of said first macromolecule liquid crystal on said first substrate for forming a first light transmitting layer, (d) providing a second substrate, (e) forming a second macromolecule liquid crystal on said second substrate, (f) curing a part of said second macromolecule liquid crystal on said second substrate for forming a second light transmitting layer, (g) combining a non-curing part of said first macromolecule liquid crystal and said second macromolecule liquid crystal for forming a third macromolecule liquid crystal between said first light transmitting layer and said second light transmitting layer, and (h) curing said third macromolecule liquid crystal for forming a third light transmitting layer.

22 Claims, 8 Drawing Sheets

METHOD FOR MANUFACTURING BRIGHTNESS ENHANCEMENT FILM OF LIQUID CRYSTAL DISPLAY AND STRUCTURE THEREOF

FIELD OF THE INVENTION

The present invention relates to a manufacturing method for a brightness enhancement film, and more particularly to a manufacturing method for a brightness enhancement film of a liquid crystal display (LCD) and the structure thereof.

BACKGROUND OF THE INVENTION

A backlight module, also known as a backlight unit, is generally an optical assembly providing a backlight source for products and applied to digital camera, PDA (Personal Digital Assistant), GPS (Global Positioning System), medical apparatus, notebook, LCD Monitor, and etc. Owing to the TFT LCD panel itself does not have a light-emitting function, it must have a light source mounted in the LCD panel. A backlight module is an important optical assembly of a light source. Therefore, a backlight module is a key component for the TFT LCD, a popular product in the present days.

The inner structure of a backlight module basically includes a light source, a reflective sheet, a light guide plate, a diffuser, a prism sheet and a frame base. Technically, a backlight module is firstly made by the method of injection molding that the propylene (acrylic sheet) is pressed to form a sheet with a smooth surface (i.e. a light guide plate). Subsequently, the diffusion spots are printed at the bottom of the light guide plate with high reflective, light-unabsorbable materials by screen printing method. And the light from the cold cathode fluorescent lamp (CCFL) which is situated at the lateral side of the thick end of the light guide plate transmits to the thin end of the light guide plate through reflection. When the light meets the diffusion spots, the reflex scatters by different angles and then transmits from the front side of the light guide plate on account of breaking the total reflection rule. The various sizes of diffusion spots and different spacings between thereof enable the light guide plate to be luminant uniformly. The reflective sheet then reflects the light leaking out from the bottom of the light guide plate back to the light guide plate for increasing the efficiency of light usage.

However, the choke point of developing TFT LCD technology is the brightness. Generally, only 5%~8% of the light source from the LCD lamp remains after transmitted through substrates to the user's eyes. According to the standard of CRT monitors, the brightness for TFT LCD is not enough. Although plenty of researches are conducted on the solution to improving brightness, such as increasing luminance of backlight source or LCD, i.e. increasing the aperture ratio of TFT LCD or luminance of all components, most of these solutions can not solve the problem without heat dissipating problem and over-consumption of electricity. For the purpose of improving brightness, 3M Company provides a solution by using the brightness enhancement films (BEF) and dual brightness enhancement films (DBEF). A brightness enhancement film is to centralize the scattered light through refracting the lateral light by V-type thin stripes. Using 3M brightness enhancement films may efficiently centralize the light scattered everywhere to the main axis of sight of the display for improving brightness without modifying the structures and over-consumption of electricity. It is a better solution nowadays but the costs are more expensive.

Another solution widely used by industry is to utilize cholesteric liquid crystal (CLC) brightness enhancement film, which is based on the optical rotation property of the cholesteric macromolecules. Please refer to FIG. 1, which is the diagram illustrating the merchandise of CLC brightness enhancement film of Nitto Denko Company. The CLC brightness enhancement film includes the substrate 11, the alignment film 12, and the plurality of CLC layers 13. Each CLC layer 13 has different ranges of transparent wavelength respectively. Through the reflective sheet 151, the light guide plate 152, the ¼ wavelength plate 16, and the polarizer 17 shown in FIG. 1, the light is efficiently transmitted from the light source 14 to the main axis of sight of a display. Since the CLC layers 13 have different optical properties when the cholesteric molecules are cured under different operating conditions, the plurality of CLC layers 13 are made by multiple coating and curing processes. Those processes are very intricate, for example, the CLC layers including red (R), green (G), and blue (B) cholesteric liquid crystal layers, which are three different polarized wavelengths shown in FIG. 1, have to be coated with a cholesteric molecules layer in sequence and subsequently cured under different operating conditions. A further method for manufacturing a plurality of CLC layers is to add dyes into them and manipulate the curing conditions. And the relative processes are more complicated. It is therefore desirous to develop a fast and simple method for manufacturing a plurality of CLC films, i.e. brightness enhancement films.

SUMMARY OF THE INVENTION

It is an object of the present invention to provide a method for manufacturing a plurality of CLC films fast and simply, i.e. brightness enhancement films.

In accordance with one aspect of the present invention, the method for manufacturing the brightness enhancement film of the LCD includes steps of: (a) providing a first substrate; (b) forming a first macromolecule liquid crystal on the first substrate; (c) curing a part of the first macromolecule liquid crystal on the first substrate for forming a first light transmitting layer; (d) providing a second substrate; (e) forming a second macromolecule liquid crystal on the second substrate; (f) curing a part of the second macromolecule liquid crystal on the second substrate for forming a second light transmitting layer; (g) combining a non-curing part of the first macromolecule liquid crystal and the second macromolecule liquid crystal for forming a third macromolecule liquid crystal between the first light transmitting layer and the second light transmitting layer; and (h) curing the third macromolecule liquid crystal for forming a third light transmitting layer.

Preferably, the first substrate and the second substrate are polyethylene terephalate substrates (PET).

Preferably, the first substrate and the second substrate each further includes an alignment film.

Preferably, the first macromolecule liquid crystal and the second macromolecule liquid crystal are cholesteric liquid crystal (CLC).

Preferably, the cholesterol molecules of the first light transmitting layer and the second light transmitting layer include a single pitch.

Preferably, the first light transmitting layer and the second light transmitting layer have the same chiral character.

Preferably, the method step (b) is finished through coating.

Preferably, the method step (c) is finished through UV light which transmits the first substrate to cure a part of the first macromolecule liquid crystal.

Preferably, the first substrate can absorb a part of the UV light.

Preferably, the method step (c) further includes a step of: (c1) providing a gas for the first macromolecule liquid crystal to control the curing thickness of the first macromolecule liquid crystal, wherein the quantity of the gas of the curing part of the first macromolecule liquid crystal is different from the quantity of the gas of a non-curing part of the first macromolecule liquid crystal.

Preferably, the method step (e) is finished through coating.

Preferably, the method step (f) is finished through UV light which transmits the second substrate to cure a part of the second macromolecule liquid crystal.

Preferably, the second substrate can absorb a part of the UV light.

Preferably, the method step (f) further includes a step of: (f1) providing a gas for the second macromolecule liquid crystal to control the curing thickness of the second macromolecule liquid crystal, wherein the quantity of the gas of the curing part of the second macromolecule liquid crystal is different from the quantity of the gas of a non-curing part of the second macromolecule liquid crystal.

Preferably, the method step (g) further includes a step of: (g1) diffusing the first macromolecule liquid crystal and the second macromolecule liquid crystal after combining to make the third macromolecule liquid crystal spread equally between the first light transmitting layer and second light transmitting layer.

Preferably, the method step (h) further includes a step of: (h1) removing the second substrate.

In accordance with another aspect of the present invention, the method for making brightness enhancement film includes steps of: (a) providing a first substrate and a second substrate; (b) forming a first and a second macromolecule liquid crystal on the first and the second substrate, respectively; (c) curing a part of the first macromolecule liquid crystal on the first substrate and a part of the second macromolecule liquid crystal on the second substrate for forming a first light transmitting layer between the first substrate and the first macromolecule liquid crystal and forming a second transmitting layer between the second substrate and the second macromolecule liquid crystal, respectively; (d) combining a non-curing part of the first macromolecule liquid crystal and the second macromolecule liquid crystal for forming a third macromolecule liquid crystal between the first light transmitting layer and the second light transmitting layer; and (e) curing the third macromolecule liquid crystal for forming a third light transmitting layer.

Preferably, the method step (c) further includes a step of: (c1) providing a gas for the macromolecule liquid crystal to control the curing thickness of the first and the second macromolecule liquid crystal, wherein the quantity of the gas of the curing part of the first and the second macromolecule liquid crystal is different from the quantity of the gas of a non-curing part of the first and the second macromolecule liquid crystal.

Preferably, the method step (c) cures a part of the first and the second macromolecule liquid crystal under different temperature control, respectively.

Preferably, the method step (d) further includes a step of: (d1) diffusing the first macromolecule liquid crystal and the second macromolecule liquid crystal after combining to make the third macromolecule liquid crystal spread equally between the first light transmitting layer and second light transmitting layer.

Preferably, step (e) further includes a step of: (e1) removing the second substrate.

Preferably, the second substrate is a ¼-wavelength plate.

It is another object of the present invention to provide a brightness enhancement film put in use on a display, the brightness enhancement film includes a first substrate; a first light transmitting layer mounted on the first substrate; a second light transmitting layer mounted on the first light transmitting layer; a third light transmitting layer mounted between the first light transmitting layer and second light transmitting layer; and a second substrate mounted on the second light transmitting layer, wherein the first and the second light transmitting layer have a first and a second chiral character, respectively, and the third light transmitting layer has a wide-band chiral character.

Certainly, the display is a LCD.

Certainly, the first substrate is a polyethylene terephalate substrate (PET).

Certainly, the brightness enhancement film further includes a first alignment film mounted between the first substrate and the first light transmitting layer.

Certainly, the first substrate is a ¼-wavelength plate.

Certainly, the first, the second and the third light transmitting layer are all made of cholesteric liquid crystal (CLC).

It is more an object of the present invention to provide a structure of a display, the structure includes a luminary for providing a backlight; a light guide plate mounted on a side of the luminary for guiding the scattering direction of the backlight; a brightness enhancement diffusion sheet mounted on the light guide plate for increasing luminance; and a liquid crystal layer mounted on the brightness enhancement diffusion sheet; wherein the brightness enhancement diffusion sheet further includes a first substrate; a first light transmitting layer mounted on the first substrate; a second light transmitting layer mounted on the first light transmitting layer; a third light transmitting layer mounted between the first light transmitting layer and second light transmitting layer; a ¼-wavelength plate mounted on the second light transmitting layer; and a polarizer mounted on the ¼-wavelength plate wherein the first and the second light transmitting layer have a first and a second chiral character, respectively, and the third light transmitting layer has a wide-band chiral character.

Preferably, the structure further includes a reflect sheet mounted below the light guide plate for increasing the efficiency of light.

The foregoing and other features and advantages of the present invention will be more clearly understood through the following descriptions with reference to the drawings, wherein:

DETAILED DESCRIPTION OF THE PREFERRED EMBODIMENTS

Figure 1:
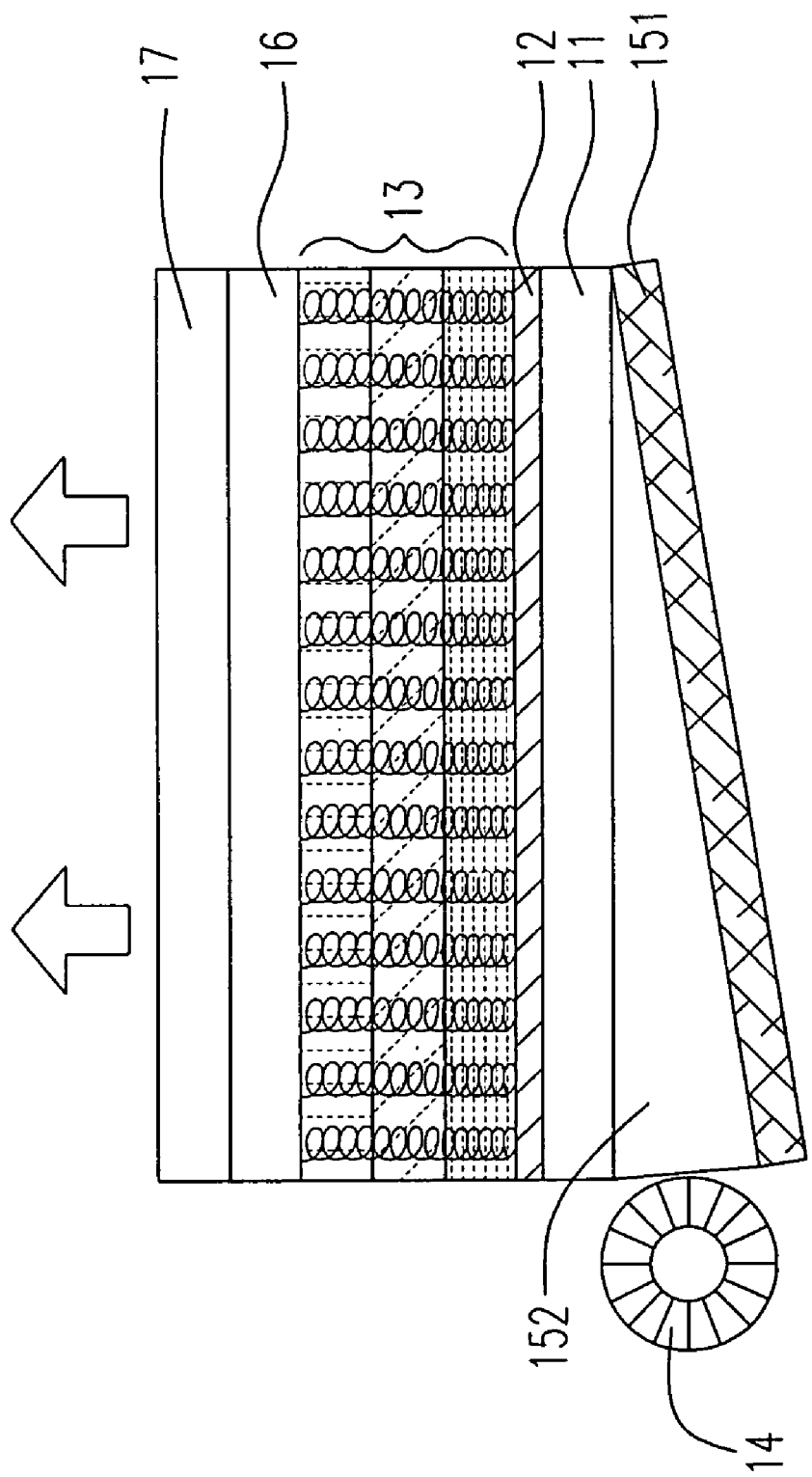
FIG. 1 is a schematic view showing a preferred backlight module structure having a brightness enhancement film according to the prior art.
Figure 2A:
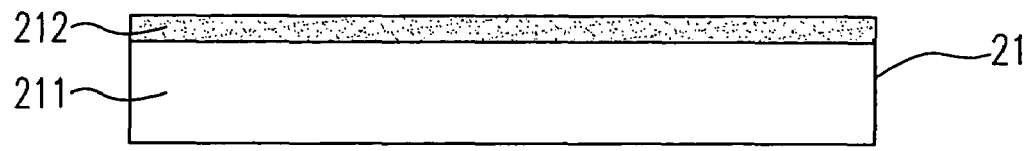
FIGS. 2A–2H are flowchart showing a method for manufacturing a brightness enhancement film in accordance with a preferred embodiment of the present invention.
Figure 2B:
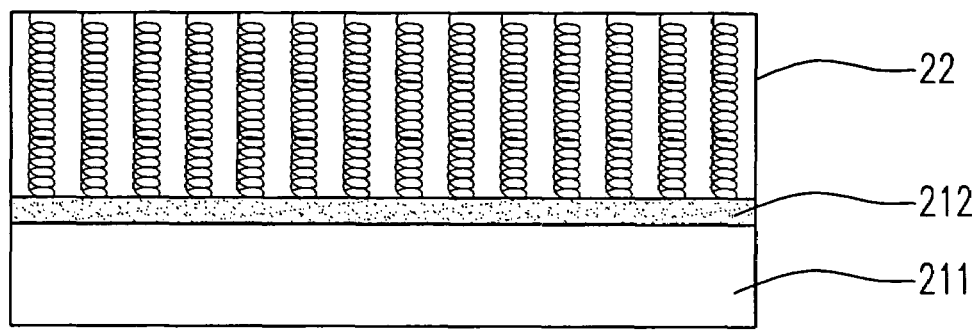
Figure 2C:
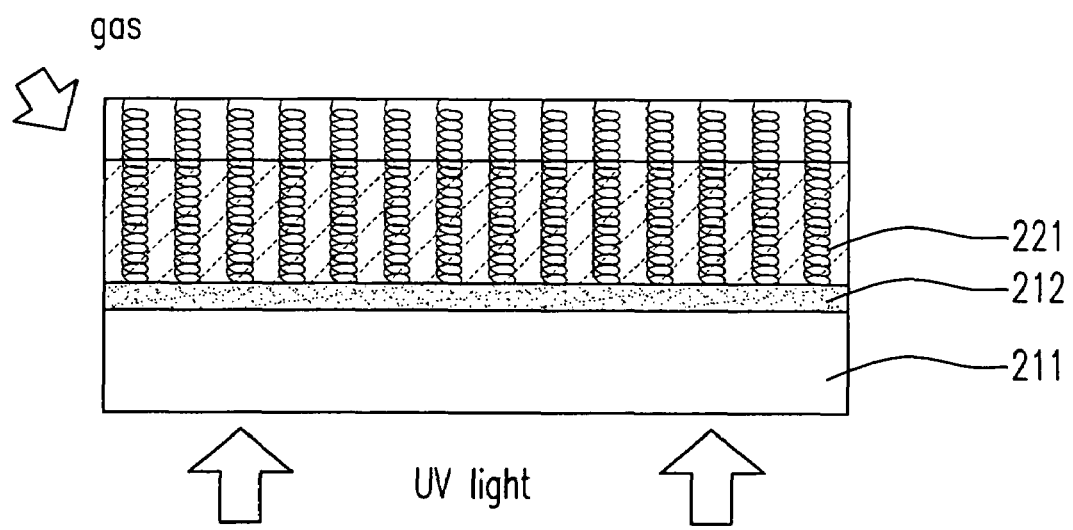
Figure 2D:
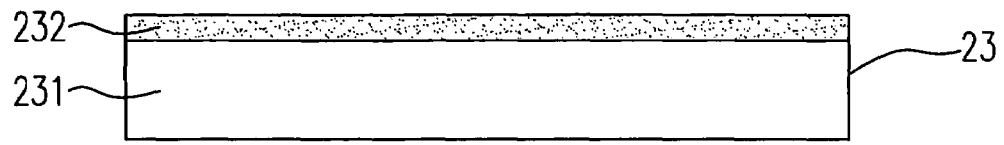
Figure 2E:
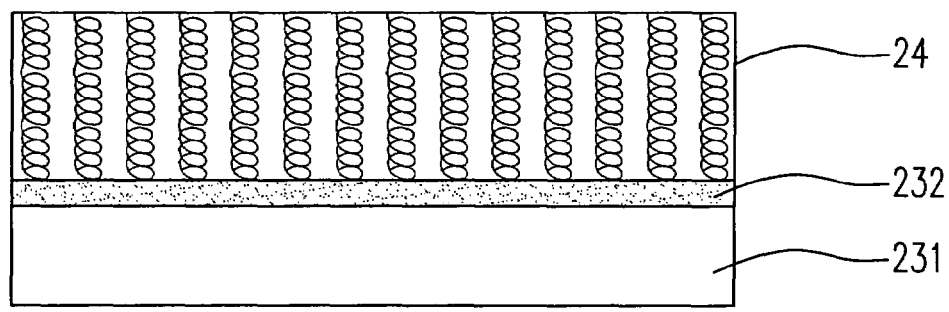
Figure 2F:
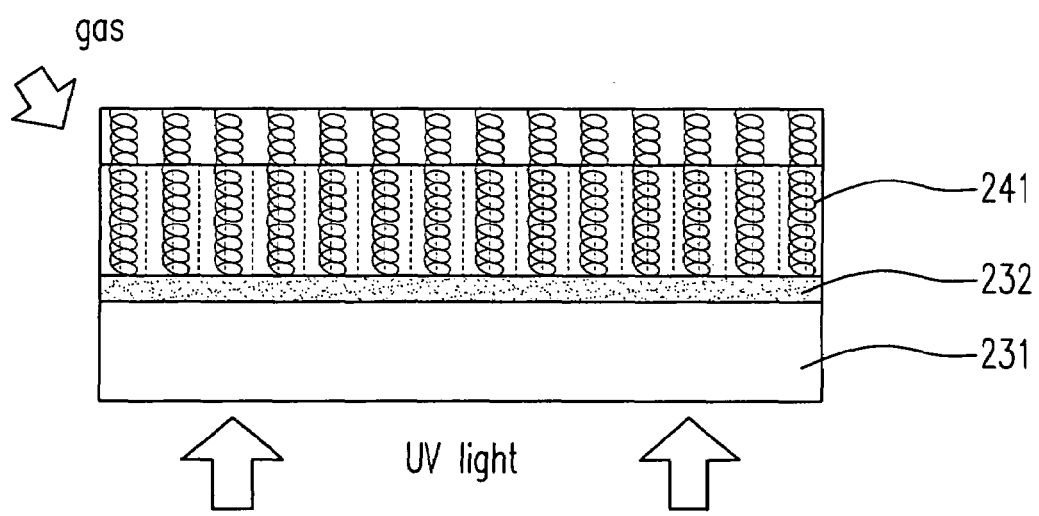
Figure 2G:
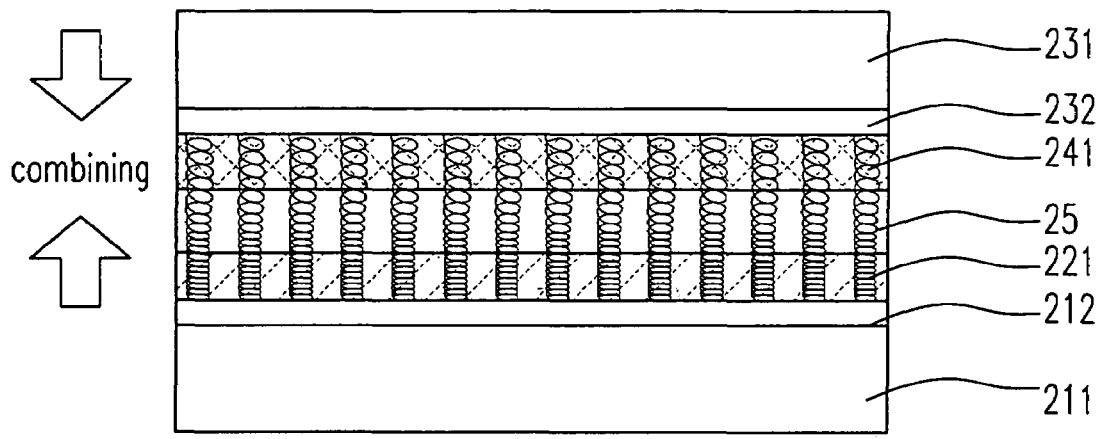
Figure 2H:
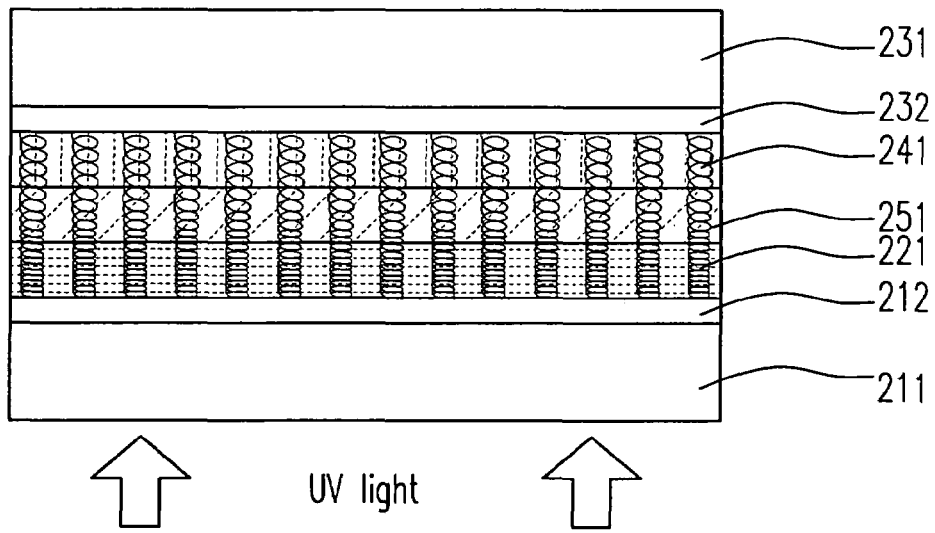

It is an object of the present invention to provide a method for manufacturing a plurality of CLC films fast and simply, i.e. brightness enhancement films.

Please refer to FIG. 2, which is the flowchart showing the method for manufacturing the brightness enhancement film in accordance with the present invention. The manufacturing method includes steps of: (1) providing the first substrate 21, as shown in FIG. 2A; (2) forming the first macromolecule liquid crystal 22 on the first substrate 21 by coating, as shown in FIG. 2B; (3) curing the part of the first macromolecule liquid crystal 22 on the first substrate 21 by UV light which is transmitted through the first substrate 21 so as to form the first light transmitting layer 221, as shown in FIG. 2C; (4) providing the second substrate 23, as shown in FIG. 2D; (5) forming the second macromolecule liquid crystal 24 on the second substrate 23 by coating, as shown in FIG. 2E; (6) curing the part of the second macromolecule liquid crystal 24 on the second substrate 23 by UV light which is transmitted through the second substrate 23 so as to form the second light transmitting layer 241, as shown in FIG. 2F; (7) combining the non-curing part of the first macromolecule liquid crystal 22 and the second macromolecule liquid crystal 24 for forming the third macromolecule liquid crystal 25 between the first light transmitting layer 221 and the second light transmitting layer 241, as shown in FIG. 2G; and (8) curing the third macromolecule liquid crystal 25 by UV light which is transmitted through the first substrate 21 or the second substrate 23 so as to form the third light transmitting layer 251. In this embodiment, the first substrate 21 and the second substrate 23 further include alignment films 212, 232 in addition to the substrate bodies 211, 231, respectively.

In accordance with one aspect of the present invention, the first macromolecule liquid crystal 22, the second macromolecule liquid crystal 24 and the third macromolecule liquid crystal 25 are cholesteric liquid crystal layers. However, after the processes of the above steps, the cholesterol molecules of the first light transmitting layer 221 and the second light transmitting layer 241 include the single pitch. In other words, the first light transmitting layer 221 and the second light transmitting layer 241 have the same optical character, i.e. specific chiral character. During the process of curing by UV light for forming the first light transmitting layer 221 and the second light transmitting layer 241, the UV light is transmitted through the first substrate 21 to cure a part of the first macromolecule liquid crystal 22 and is transmitted through the second substrate 23 to cure a part of the second macromolecule liquid crystal 24. In accordance with the aspect of the present invention, the first substrate 21 and the second substrate 23 can absorb partial UV light in order to be adjusted to the operation conditions when curing the macromolecule liquid crystal 22, 24 for forming the light transmitting layer 221, 241. Furthermore, the macromolecule liquid crystal 22, 24 according to the present application are accomplished through coating but the formation of the the macromolecule liquid crystal 22, 24 is not limited in this way.

In accordance with another aspect of the present invention, the method for making the brightness enhancement film includes steps of: (a) providing the first substrate 21 and the second substrate 23; (b) forming the first and the second macromolecule liquid crystal 22, 24 on the first and the second substrate 21, 23 by coating, respectively; (c) curing a part of the first macromolecule liquid crystal 22 on the first substrate 21 and a part of the second macromolecule liquid crystal 24 on the second substrate 23 for forming the first light transmitting layer 221 between the first substrate 21 and the first macromolecule liquid crystal 22 and forming the second transmitting 241 layer between the second substrate 23 and the second macromolecule liquid crystal 24, respectively; (d) combining the non-curing part of the first macromolecule liquid crystal 22 and the second macromolecule liquid crystal 24 for forming the third macromolecule liquid crystal 25 between the first light transmitting layer 221 and the second light transmitting layer 241; and (e) curing the third macromolecule liquid crystal 25 for forming the third light transmitting layer 251. In accordance with the previous embodiment, the first macromolecule liquid crystal 22, the second macromolecule liquid crystal 24 and the third macromolecule liquid crystal 25 are cholesteric liquid crystal layers. However, after the processes of the above steps, the cholesterol molecules of the first light transmitting layer 221 and the second light transmitting layer 241 include the single pitch. In other words, the first light transmitting layer 221 and the second light transmitting layer 241 have the same optical character, i.e. specific chiral character.

Figure 3A:
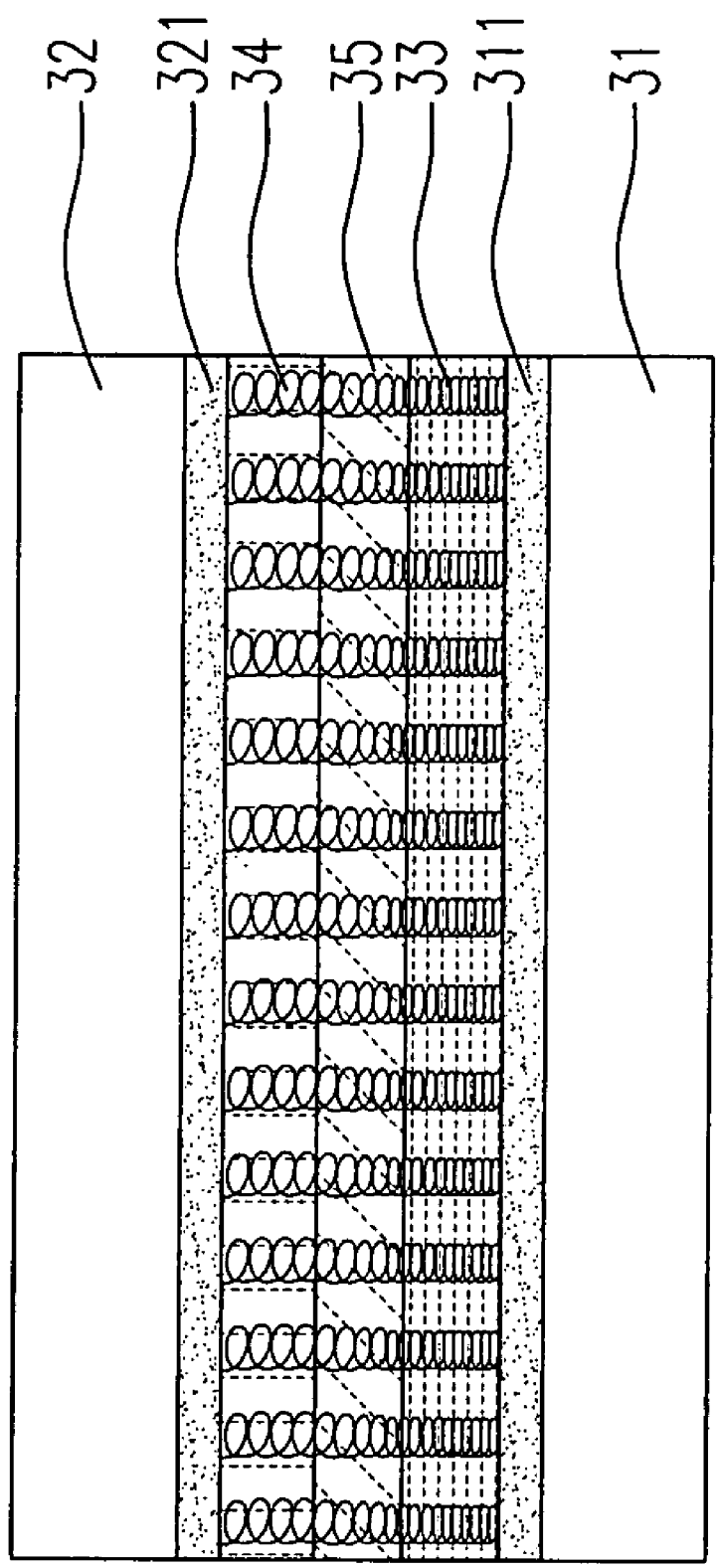
FIGS. 3A–3B are a schematic views showing structures of brightness enhancement films in accordance with a preferred embodiment of the present invention.
Figure 3B:
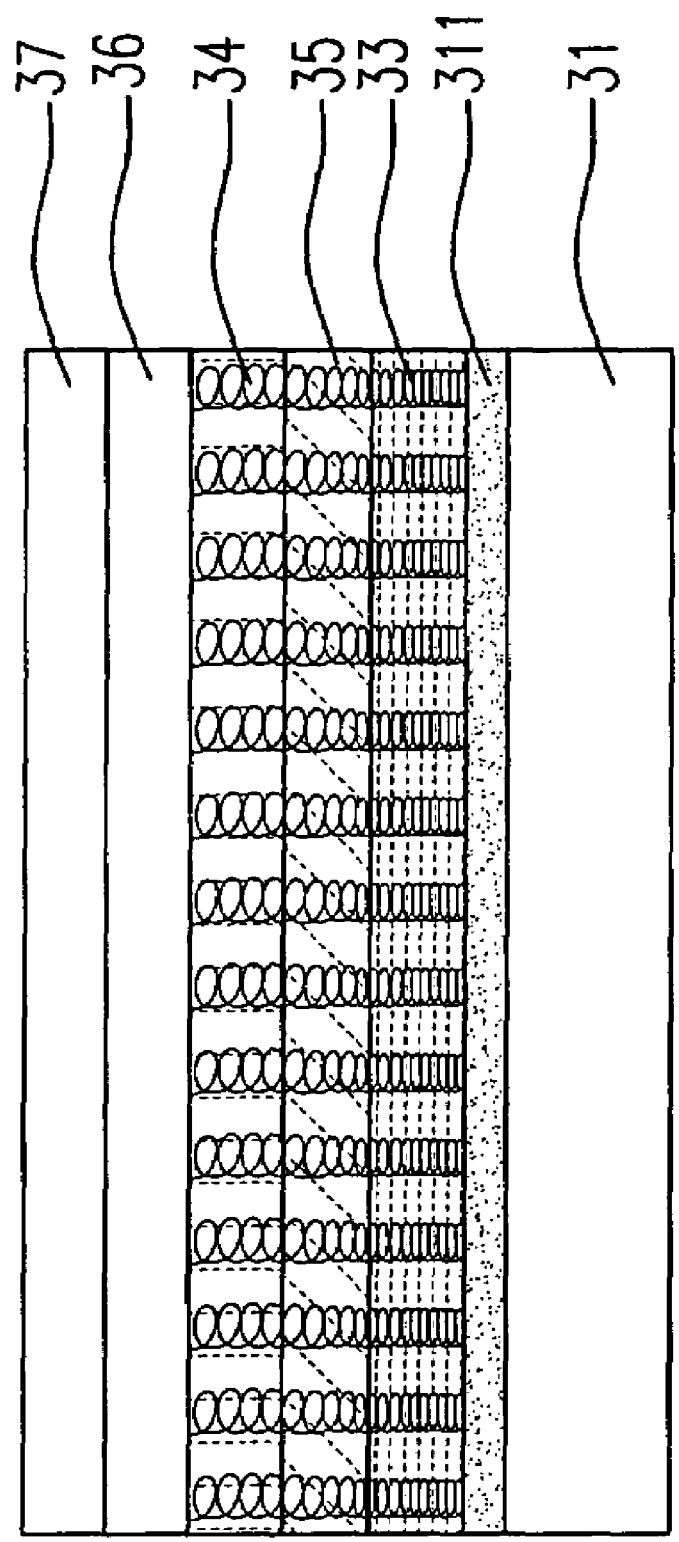

Please refer to FIG. 3A, which discloses a brightness enhancement film manufactured by a fast and simple method mentioned above. The structure includes the first substrate 31, the second substrate 32, the first light transmitting layer 33, the second light transmitting layer 34, and the third light transmitting layer 35. The first light transmitting layer 33 is mounted on the first substrate 31. The second light transmitting layer 34 is mounted on the first light transmitting layer 33. The third light transmitting layer 35 is mounted between the first light transmitting layer 33 and second light transmitting layer 34. The second substrate 32 is mounted on the second light transmitting layer 34. The first and the second light transmitting layer 33, 34 have the first and the second chiral character, respectively, and the third light transmitting layer 35 has the wide-band chiral character. The brightness enhancement film according to this embodiment could be put in use on the backlight module of the LCD for increasing luminance of the backlight module, wherein the first substrate 31 and the second substrate 32 are polyethylene terephalate (PET) substrates. Moreover, the brightness enhancement film further includes the first alignment film 311 and the second alignment film 321. The first alignment film 311 is mounted between the first substrate 31 and the first light transmitting layer 33. The second alignment film 321 is mounted between the second substrate 32 and the second light transmitting layer 34. Certainly, the first, the second and the third light transmitting layer 33, 34, 35 are all made of cholesteric liquid crystal (CLC) wherein the cholesterol molecules of the first light transmitting layer 33 and the second light transmitting layer 34 include the single pitch and the chiral character, respectively. As shown in FIG. 3A, the first, the second and the third light transmitting layer 33, 34, 35 include blue (B), green (G) and red (R) cholestric liquid crystal layers, which are three different polarized wavelengths, respectively. However, different and desired polarized wavelengths could be obtained by changing operation conditions of the manufacturing method mentioned above. Besides, the second substrate 32 could be the ¼- wavelength plate according to the previous method. As shown in FIG. 3B, it is also possible to combine the ¼-wavelength plate 36 and the polarizer 37 instead after removing the second substrate 32 in the manufacturing process.

Figure 4:
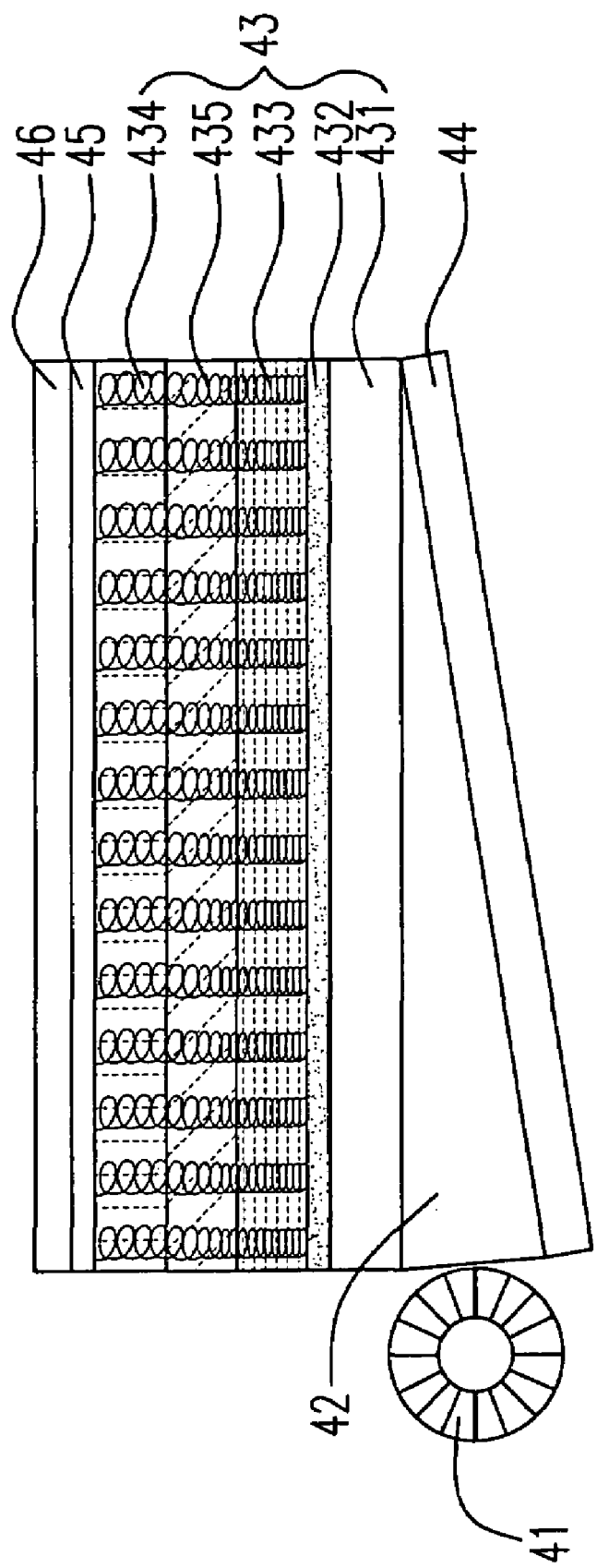
FIG. 4 is a schematic view showing a backlight module having a brightness enhancement film in accordance with a preferred embodiment of the present invention.

Please refer to FIG. 4, which is a preferred embodiment of a backlight module having a brightness enhancement film in accordance with the present invention. The backlight module includes the luminary 41, the light guide plate 42, and the brightness enhancement sheet 43. The luminary 41 is used for providing the backlight. The light guide plate 42 is mounted on the side of the luminary 41 for guiding the scattering direction of the backlight. The brightness enhancement sheet 43 is mounted on the light guide plate 42 for increasing luminance. The brightness enhancement sheet 43 is made according to the method mentioned above. The brightness enhancement sheet 43 includes the first substrate 431, the multilayer brightness enhancement sheet, and the ¼-wavelength plate 45. The multilayer brightness enhancement sheet are mounted between the first substrate 431 and the ¼-wavelength plate 45. The multilayer brightness enhancement sheet further includes the first light transmitting layer 433, the third light transmitting layer 435 and the second light transmitting layer 434 in sequence. The first light transmitting layer 433 and the second light transmitting layer 434 have the first and the second chiral character, respectively, while the third light transmitting layer 35 has the wide-band chiral character. Moreover, the first substrate 431 is the polyethylene terephalate (PET) substrate and the brightness enhancement sheet further includes the first alignment film 432 mounted between the first substrate 431 and the first light transmitting layer 433. Certainly, the first, the second and the third light transmitting layer 433, 434, 435 are all made of cholesteric liquid crystal (CLC). Therefore, the cholesterol molecules of the first light transmitting layer 433 and the second light transmitting layer 434 include the single pitch after processed by the method mentioned above. As shown in FIG. 4, the backlight module according to the present application further includes the polarizer 46 and the reflective sheet 44. The reflective sheet 44 is mounted below the light guide plate 42 for improving the the efficiency of light usage.

Figure 5:
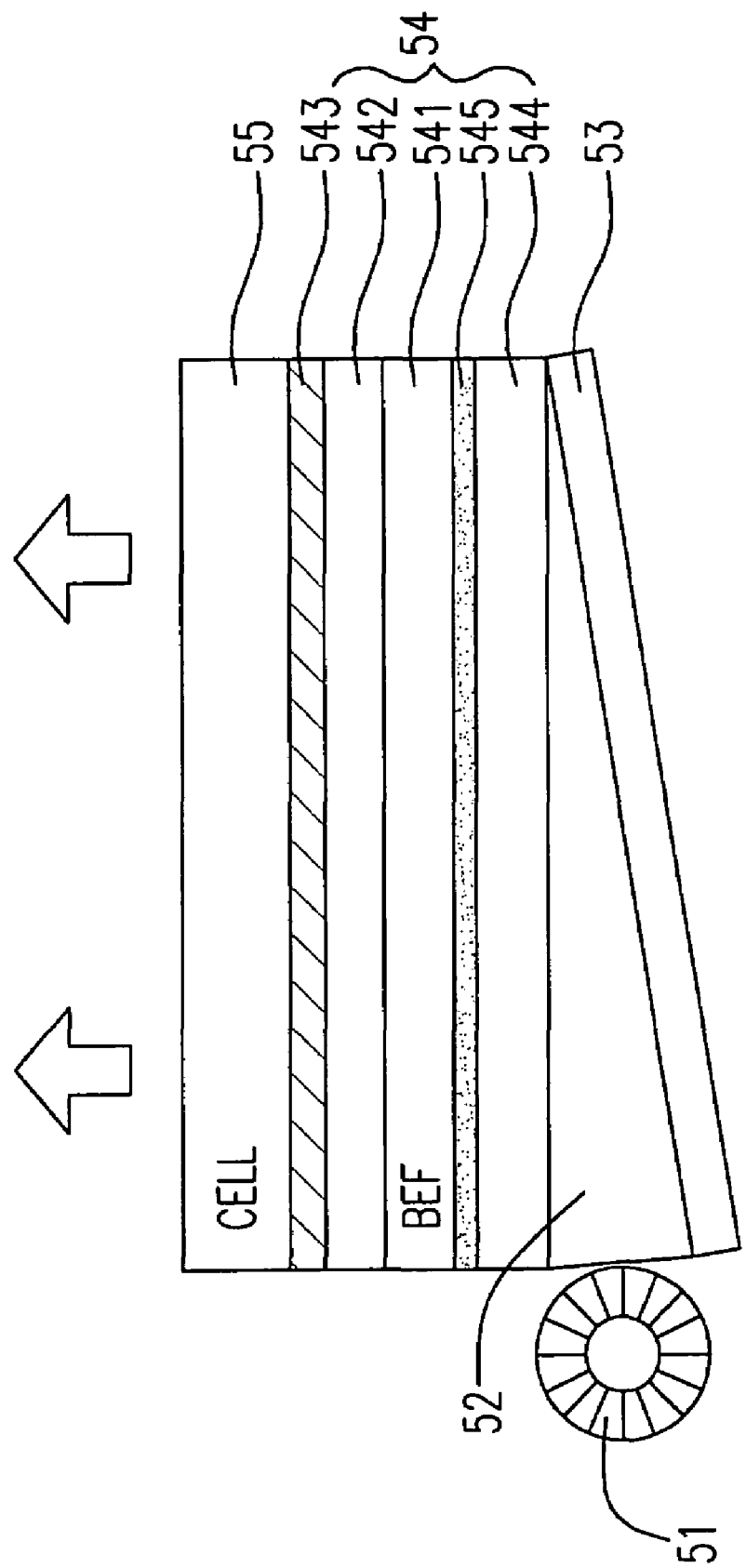
FIG. 5 is a schematic view showing a brightness enhancement diffusion sheet used in LCD module according to a preferred embodiment of the present invention.

Please refer to FIG. 5, which is a schematic view showing a brightness enhancement diffusion sheet according to the present invention put in use on a LCD. As shown in FIG. 5, the LCD includes the luminary 51, the light guide plate 52, the brightness enhancement diffusion sheet 54, and the liquid crystal layer 55. The luminary 51 is used for providing the backlight. The light guide plate 52 is mounted on the side of the luminary 51 for guiding the scattering direction of the backlight. The brightness enhancement diffusion sheet 54 is mounted on the light guide plate 52 for increasing luminance. The liquid crystal layer 55 is mounted on the brightness enhancement diffusion sheet 54. The brightness enhancement diffusion sheet 54 is made according to the method mentioned above. The brightness enhancement diffusion sheet 54 includes the first substrate 544, the multilayer brightness enhancement sheet 541, the ¼-wavelength plate 542, and the polarizer 543. The multilayer brightness enhancement sheet 541 includes the first light transmitting layer, the second light transmitting layer and the third light transmitting layer in accordance with the structure mentioned above. The first light transmitting layer and the second light transmitting layer have the first and the second chiral character respectively, while the third light transmitting layer 35 has the wide-band chiral character. Therefore, the preferred LCD is obtained by means of combining the component in accordance with the present invention. While specific embodiments have been shown and described, many modifications and variations could be made by one skilled in the art.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claim is:

1. A method for manufacturing a brightness enhancement film of a liquid crystal display (LCD) comprising steps of:
   (a) providing a first substrate;
   (b) forming a first macromolecule liquid crystal on said first substrate;
   (c) curing a part of said first macromolecule liquid crystal on said first substrate for forming a first light transmitting layer;
   (d) providing a second substrate;
   (e) forming a second macromolecule liquid crystal on said second substrate;
   (f) curing a part of said second macromolecule liquid crystal on said second substrate for forming a second light transmitting layer;
   (g) combining a non-cured part of said first macromolecule liquid crystal and a non-cured part of said second macromolecule liquid crystal for forming a third macromolecule liquid crystal between said first light transmitting layer and said second light transmitting layer; and
   (h) curing said third macromolecule liquid crystal for forming a third light transmitting layer.

2. A method according to claim 1 wherein said first substrate and said second substrate are polyethylene terephalate substrates (PET).

3. A method according to claim 1 wherein said first substrate and said second substrate each further comprises an alignment film.

4. A method according to claim 1 wherein said first macromolecule liquid crystal and second macromolecule liquid crystal are cholesteric liquid crystal (CLC).

5. A method according to claim 4 wherein the cholesterol molecules of said first light transmitting layer and said second light transmitting layer comprise a single pitch.

6. A method according to claim 4 wherein said first light transmitting layer and said second light transmitting layer have the same chiral character.

7. A method according to claim 1 wherein said step (b) is finished through coating.

8. A method according to claim 1 wherein said step (c) is finished through UV light which transmits said first substrate to cure a part of said first macromolecule liquid crystal.

9. A method according to claim 8 wherein said first substrate can absorb a part of said UV light.

10. A method according to claim 1 wherein said step (c) further comprises a step of:
   (c1) providing a gas for said first macromolecule liquid crystal to control the curing thickness of said first macromolecule liquid crystal, wherein the quantity of said gas of said curing part of said first macromolecule liquid crystal is different from the quantity of said gas of a non-curing part of said first macromolecule liquid crystal.

11. A method according to claim 1 wherein said step (e) is finished through coating.

12. A method according to claim 1 wherein said step (f) is finished through UV light which transmits said second substrate to cure a part of said second macromolecule liquid crystal.

13. A method according to claim 12 wherein said second substrate can absorb a part of said UV light.

14. A method according to claim 1 wherein said step (f) further comprises a step of:
  (f1) providing a gas for said second macromolecule liquid crystal to control the curing thickness of said second macromolecule liquid crystal, wherein the quantity of said gas of said curing part of said second macromolecule liquid crystal is different from the quantity of said gas of a non-curing part of said second macromolecule liquid crystal.

15. A method according to claim 1 wherein said step (g) further comprises a step of:
  (g1) diffusing said first macromolecule liquid crystal and said second macromolecule liquid crystal after combining to make said third macromolecule liquid crystal spread equally between said first light transmitting layer and second light transmitting layer.

16. A method according to claim 1 wherein said step (h) further comprises a step of: (h1) removing said second substrate.

17. A method for making brightness enhancement film, said method comprising steps of:
  (a) providing a first substrate and a second substrate;
  (b) forming a first and a second macromolecule liquid crystal on said first and said second substrate, respectively;
  (c) curing a part of said first macromolecule liquid crystal on said first substrate and a part of said second macromolecule liquid crystal on said second substrate for forming a first light transmitting layer between said first substrate and said first macromolecule liquid crystal and forming a second light transmitting layer between said second substrate and said second macromolecule liquid crystal, respectively;
  (d) combining a non-cured part of said first macromolecule liquid crystal and a non-cured part of said second macromolecule liquid crystal for forming a third macromolecule liquid crystal between said first light transmitting layer and said second light transmitting layer; and
  (e) curing said third macromolecule liquid crystal for forming a third light transmitting layer.

18. A method according to claim 17 wherein step (c) further comprises a step of:
  (c1) providing a gas for said macromolecule liquid crystal to control the curing thickness of said first and said second macromolecule liquid crystal, wherein the quantity of said gas of said curing part of said first and said second macromolecule liquid crystal is different from the quantity of said gas of a non-curing part of said first and said second macromolecule liquid crystal.

19. A method according to claim 17 wherein step (c) cures a part of said first and said second macromolecule liquid crystal under different temperature control, respectively.

20. A method according to claim 17 wherein step (d) further comprises a step of:
  (d1) diffusing said first macromolecule liquid crystal and said second macromolecule liquid crystal after combining to make said third macromolecule liquid crystal spread equally between said first light transmitting layer and second light transmitting layer.

21. A method according to claim 17 wherein step (e) further comprises a step of:
  (e1) removing said second substrate.

22. A method according to claim 17 wherein said second substrate is a ¼-wavelength plate.

* * * * *